Patented July 20, 1954

UNITED STATES PATENT OFFICE 2,684,356

SYNTHETIC RUBBER AND PREPARATION THEREOF

Erving Arundale and Fred W. Banes, Westfield, N. J., assignors to Standard Oil Development Company, a corporation of Delaware No Drawing. Application July 3, 1950, Serial No. 172,007

6 Claims. (Cl. 260—80.7)

This invention relates to a new type of oil-resistant rubber, and the preparation thereof. More particularly, it relates to a diene-nitrile type of synthetic rubber modified by a certain controlled small amount of particular cross-linking agents. The invention may be illustrated by a copolymer of about 75% by weight of butadiene, and 25% by weight of acrylonitrile, modified during polymerization by .05% by weight of divinylbenzene.

The diolefin which may be used may include butadiene-1,3, isoprene, piperylene, dimethyl butadiene, 2-methyl pentadiene, etc. or mixtures thereof.

The nitrile comonomer should be a compound having the general formula $CH_2=C(R)-CN$ where R is hydrogen, methyl, ethyl or chlorine.

The cross-linking agent to be used is preferably a divinyl aromatic hydrocarbon, such as divinyl benzene, divinyl toluene, divinyl xylene, divinyl naphthalene, di-isopropenyl benzene, etc. having the two vinyl groups in any of the ortho, meta, or para positions; but in place of such compounds, one may use other organic compounds having two reactive cross-linking groups, such as various dimercaptans, e. g. decamethylene mercaptan, dithiophenol, bis mercapto methyl xylol, etc.

The proportions in which the above three reactants are used may vary somewhat according to the purposes for which the synthetic rubber is to be used, but normally will be within the limit of 55–85, preferably 65–82, per cent by weight of diolefin, 15–45, preferably 18–35, per cent by weight of the nitrile monomer, and .01–1.0, preferably 0.05–0.5, per cent by weight of the cross-linking agent.

The preferred method of carrying out the polymerization is to emulsify the reactants in water, with a suitable emulsifier, together with a suitable catalyst, and preferably with the addition of one or more of the known polymerization modifiers, and maintaining the resultant emulsion at the desired polymerization temperature until the desired degree of polymerization has been attained.

Suitable emulsifying agents include the various water-soluble soaps such as alkali metal soaps, e. g. sodium stearate, sodium oleate, or other sodium, potassium and ammonium soaps of saturated or slightly unsaturated fatty acids of 8 to 24, preferably about 12 to 20 carbon atoms, such as stearic, oleic, caprylic, palmitic, lauric, carnaubic, etc. acids. Sodium or potassium soaps of oleic or stearic acid are usually preferred, and often a slight excess of fatty acid over alkali may be beneficially present. In the case of ammonium soaps, it may be desirable to have a slight excess of ammonia. The amount of emulsifier, such as the above mentioned soaps, should be about 0.5 to 5 parts by weight per 100 parts by weight of polymerization monomers. In place of, or in addition to, the ordinary soaps another emulsifier such as the sodium salt of a formaldehyde condensed naphthalene sulfonic acid, or sodium lauryl sulfate, sodium tetraisobutylene sulfonate or aromatic alkyl sulfonate salts, etc. may be used also.

The polymerization may be carried out at temperatures between about —20° C. to +60° C., but temperatures between 30 and 50° C. are most common. When the polymerization temperature is below the natural freezing point of the emulsion, as in the so-called Redox systems described in Industrial and Engineering Chemistry, vol. 40, pp. 770–777 and pp. 932–937, it is necessary to add an anti-freeze agent such as methanol, ethanol, ethylene glycol or glycerine. The polymerization reaction may be carried to a conversion of about 50 to 100%, preferably 65 to 85%, and normally requires between about 5 and 48 hours depending on the temperature and other factors, as is well-known.

The catalyst used may be any one or a mixture of the known class of oxygen-liberating catalysts such as hydrogen peroxide, benzoyl peroxide, cumene hydroperoxide, tertiary butyl hydroperoxide, potassium persulfate or other alkali metal persulfates or perborates or the corresponding ammonium salts. Between 0.05 to 2% of catalyst based on weight of monomers is used, the optimum amount being dependent primarily on catalyst type and polymerization temperature.

Furthermore, about 0.25 to 1.0% of a mercaptan modifier based on weight of monomers is also normally present. The mercaptans may be primary or tertiary mercaptans having 6 to 18 carbon atoms such as hexyl, decyl, dodecyl, tetradecyl, or octadecyl, but preferably a mixture comprising a substantial percentage of dodecyl with minor amounts of other $C_{10}$ to $C_{14}$ mercaptans.

In the emulsification, the amount of water to be used should be about 0.5 to 3.0, preferably 1 to 2, volumes per volume of mixed reactants. The reaction time should generally be about 1 to 50 hours, preferably 5 to 30 hours.

Thus, according to the present invention, the use of a controlled small amount of cross-linking agent effects improvements in the diene-nitrile synthetic rubber both in the latex form and in the dry rubber form. The use of divinyl benzene or other cross-linking agent mentioned, improves the wet gel strength of the diene-nitrile latex, and, after coagulation, the dry rubber has substantially improved processability and other characteristics, such as reduced banding time and reduced calender shrinkage. Another surprising result is that the present invention obtains improved processability although the Williams plasticity value is increased, and the molecular weight is increased.

The invention will be better understood from the following experimental data:

A series of five runs were made using various amounts of divinyl benzene ranging from 0 to 0.50% by weight (on the weight of reactants).

using a diene-nitrile monomer mixture consisting of 74% by weight of butadiene and 26% by weight of acrylonitrile. The following general conditions were used in carrying out this series of polymerizations:

| | |
|---|---|
| Ratio water/reactants | 1.8/1. |
| Per cent oleic acid (on reactants) | 3.25. |
| Extent of neutralization | 83%. |
| Per cent K₂S₂O₈ (on reactants) | 0.3%. |
| Per cent mercaptan (on reactants) | 0.53% |
| Divinyl benzene | Varied. |
| Polymerized | 17 hrs. at 30–31° C. |

The lattices were short-stopped with 0.2% hydroquinone, stabilized with 2% phenyl beta naphthyl amine and then coagulated, and the polymer washed and dried.

The resulting polymers showed the following evaluation:

| Run | Percent DVB [1] | Percent Conv. [2] | Gel Content | Gel Swell | (Soluble Frac.) Int. Visc. | (Soluble Frac.) Mol. Wt. | Williams Plasticity |
|---|---|---|---|---|---|---|---|
| 1 | 0 | 67 | 0 | --- | 1.06 | 183,000 | 89–3 |
| 2 | .05 | 71 | 4.5 | 205 | 1.53 | 325,000 | 121–13 |
| 3 | .10 | 76 | 17.3 | 135 | 1.27 | 240,000 | 137–27 |
| 4 | .25 | 75 | 50.3 | 45 | 0.74 | 105,000 | 146–19 |
| 5 | .50 | 74 | 75.8 | 25 | --- | --- | 147–8 |

[1] Percent divinyl benzene on diene-nitrile reactants.
[2] Percent conversion after 17 hours at 30–31° C.

The addition of divinyl benzene therefore activates the synthesis somewhat and as little as 0.05 part per 100 parts reactants produces an approximate doubling of the molecular weight without causing appreciable gel formation. Larger amounts produce extensive cross-linking with a resulting high gel content, and the plasticity also increases when increasing the quantity of DVB.

Another series of runs was made to show the corresponding improvement in wet gel strength of a diene-nitrile rubber latex, using a small amount of divinyl benzene as cross-linking improver.

Three turbomixer runs were made under the standard conditions listed below. Samples were removed at various intervals so that changes in gel content, gel swell, and molecular weight could be followed throughout the runs.

| | |
|---|---|
| Ratio butadiene/acrylonitrile | 74/26. |
| Ratio water/reactants | 1.8/1. |
| Per cent oleic acid (on reactants) | 3.25. |
| Extent of acid neutralization | 85%. |
| Per cent K₂S₂O₈ (on reactants) | 0.3. |
| Per cent morpholine (on reactants) | 0.1. |
| Per cent divinyl benzene | Varied |
| Per cent lorol mercaptan (on reactants) (Mercaptan added ½ initially, ¼ at 20% conv., ¼ at 50% conv. | 0.53. |
| Reaction conditions | 8–9½ hours at 31° C. to 75% conversion. |

The samples taken during the runs at conversion levels of approximately 20, 35, 50, 65 and 75% were stabilized, coagulated, washed, dried and analyzed for gel content and molecular weight. The polymer possessing the highest molecular weight (400,000) and a low gel content can be obtained using 0.05% divinyl benzene and carrying the polymerization to 65–70% conversion.

The latices from the three runs containing 0, 0.05, and 0.25 part of divinyl benzene were short-stopped at 75% conversion with 0.2% hydroquinone and 0.2% 2,6-ditertiary butyl para cresol and then vacuum stripped. The stripped latices were creamed to 54% solids using a recipe similar to that used in Example 2 of Patent 2,444,801, and wet gel strength determinations were run on the concentrates. The data are given below:

| Percent Divinyl Benzene | Williams Plasticity | Wet Gel Yield Pressure Cm. Hg |
|---|---|---|
| 0 | 154–65 | 33.1 |
| 0 | 101–7 | 30.1 |
| 0.05 | 165–134 | 35.4 |
| 0.25 | --- | 13.0 |

It appears that the wet gel strength of substantially gel free polymers can be improved through the addition of small amounts of divinyl benzene. However, the improvement obtained can be attributed to the increase in polymer plasticity which occurs as a result of the addition of the cross-linking agent.

The same three latices, together with an additional one made using 0.50% divinyl benzene in the polymerization, were coagulated with brine and carbon dioxide and the polymers washed and dried 8 hours at 170° F. The properties of the polymers and the evaluation data are presented in the following table:

| Percent DVB | Percent RSH | Gel | Plast. | Milling, Min. Band (a) | Milling, Min. Black (b) | Percent Calender Shrinkage (c) | Vulc. 60' at 287° F. Tens. | Vulc. 60' at 287° F. Mod. | Vulc. 60' at 287° F. Elong. |
|---|---|---|---|---|---|---|---|---|---|
| 0 | 0.53 | 1.1 | 112–4 | 10 | 13 | 41 | 2,835 | 890 | 695 |
| 0.05 | 0.53 | 13.1 | 154–26 | 12 | 14 | 37.3 | 3,060 | 1,610 | 465 |
| 0.25 | 0.53 | 63.8 | 165–101 | 3 | 11 | 22.1 | 3,315 | 2,435 | 390 |
| 0.50 | 0.80 | 71.3 | 114–14 | 1 | 6 | 23.0 | 2,200 | 1,475 | 410 |

Formula: Polymer 100, zinc oxide 5, stearic acid 1, MPC Black 50, sulfur 1.5, Altax 1.
(a) Minutes required to band 300 g. on a 6″ x 12″ mill.
(b) Minutes required to incorporate 150 g. of MPC black into 300 g. of polymer on a 6″ x 12″ mill.
(c) A test compound of 100 parts of polymer and 50 parts of MPC black was used for this test.

For a given amount of mercaptan modifier therefore, an increase in the amount of divinyl benzene added produces an improvement in processability, a reduction in calender shrinkage, an increase in tensile strength and modulus, and a reduced elongation. This improvement in processing characteristics is interesting in view of the fact that the gel content of the polymer and the Williams plasticity increase with increased amounts of cross-linking agent. Heretofore, it has been found that polymer processability is improved as the Williams plasticity is decreased.

Calender shrinkage is important where calendered sheet formed should keep the imprint of the original shape. The rubber shoe industry is one example where shrinkage must be quite small in order to keep the pattern clear and definite. Other uses where calender shrinkage must be low are soles of shoes, rubbers, cover belts, etc. A shrinkage of 20% is considered good and less than 5% is excellent.

It is herewith intended to claim all modifications coming within the scope and spirit of the invention.

What is claimed is:

1. A synthetic rubber copolymer of about 55–85% by weight of butadiene and 15–45% by weight of acrylonitrile, and also having copolymerized therewith .05 to 1.0% by weight of divinylbenzene, said copolymer being adapted, upon curing, to have less calender shrinkage and greater tensile strength than a copolymer similar except without the cross-linking agent.

2. An oil-resistant synthetic rubber copolymer of 65–74% by weight of butadiene, 26–35% of acrylonitrile, and .05–0.5% of divinyl benzene, said copolymer having not over 75% gel, a Williams plasticity of about 114–165, said copolymer being adapted, upon curing, to have less calender shrinkage and greater tensile strength than a copolymer similar except without the divinyl benzene, the tensile strength, after 60 minute cure, being at least 2200, and the 300% modulus being at least 1475.

3. An oil-resistant synthetic rubber copolymer of about 74% by weight of butadiene, 26% of acrylonitrile and about 0.25% of divinyl benzene, said copolymer having a Williams plasticity of about 165, a banding time of about 3 minutes to band 300 grams on a 6" x 12" mill, a calender shrinkage of about 22.1% and, after a 60 minute cure, a tensile strength of about 3315 pounds per sq. inch and a 300% modulus of about 2435, said tensile strength and modulus being substantially higher than obtainable with a similar copolymer free from divinyl benzene.

4. The process which comprises subjecting to emulsion polymerization a monomer mixture comprising 55–85% by weight of butadiene, 15–45% by weight of acrylonitrile and .05 to 1.0% by weight of divinylbenzene with 0.5 to 3 volumes of water per volume of mixed reactants, in the presence of a peroxidizing type polymerization catalyst, at a temperature between $-20°$ C. and $+60°$ C., whereby an oil-resistant synthetic rubber copolymer is produced which is adapted, upon curing, to have less calender shrinkage and greater tensile strength than a similar copolymer free from cross-linking agent.

5. The process of preparing an improved oil-resistant synthetic rubber comprising subjecting to emulsion polymerization a monomer mixture consisting essentially of 65–74% by weight of butadiene, 26–35% by weight of acrylonitrile, and .05 to 0.5 by weight of divinyl benzene, with about 1 to 2 volumes of water per volume of mixed reactants, in the presence of 0.5 to 5.0% by weight of emulsifying agent, based on the weight of reactants, and in the presence of 0.25 to 1.0% of a polymerization modifier comprising an alkyl mercaptan of 6 to 18 carbon atoms, and in the presence of a peroxidizing type polymerization catalyst, at a temperature of about 10 to 45° C. for a reaction time of about 5–30 hours, whereby there is produced a copolymer having not over 75% gel, a Williams plasticity of about 114–165, and adapted, upon curing, to have less calender shrinkage and greater tensile strength than a similar copolymer free from divinyl benzene.

6. The process of preparing an improved oil-resistant synthetic rubber which consists essentially in subjecting to emulsion polymerization a monomer mixture consisting essentially of 74% by weight of butadiene, 26% of acrylonitrile and about 0.25% of divinyl benzene, with about 1 to 2 volumes of water per volume of mixed reactants, in the presence of 0.5 to 5.0% by weight of emulsifying agent, based on the weight of reactants, and in the presence of about 0.53 to 0.80% of a polymerization modifier consisting essentially of alkyl mercaptans of 10 to 14 carbon atoms, and in the presence of a peroxidizing type polymerization catalyst for about 17 hours at about 30–31° C., whereby there is produced a product as described in claim 3.

References Cited in the file of this patent

UNITED STATES PATENTS

| Number | Name | Date |
|---|---|---|
| 2,281,613 | Walthan et al. | May 5, 1942 |
| 2,474,807 | Schoene | July 5, 1949 |

OTHER REFERENCES

Schoene et al.: Ind. and Eng. Chem., vol. 38; No. 12, December 1946, pages 1246–1249.